United States Patent
Gee

(10) Patent No.: US 6,200,085 B1
(45) Date of Patent: *Mar. 13, 2001

(54) TRANSPORT SYSTEM FOR FARM COMBINES AND OTHER LARGE VEHICLES

(76) Inventor: Stuart Gee, 1882 County Rd. K, Colby, KS (US) 67701

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/264,263

(22) Filed: Mar. 8, 1999

(51) Int. Cl.[7] ............... B60P 3/06; A01D 41/00; A01D 75/30
(52) U.S. Cl. ............ 414/813; 414/538; 414/559; 414/679
(58) Field of Search .......................... 414/506, 507, 414/529, 538, 559, 679, 494, 491, 333, 339, 813

(56) References Cited

U.S. PATENT DOCUMENTS

| | | | |
|---|---|---|---|
| 2,135,857 | * 11/1938 | Stahl | 414/494 |
| 2,514,752 | * 7/1950 | Faulkner et al. | 414/506 X |
| 2,765,938 | * 10/1956 | Di Addezio | 414/538 X |
| 2,849,135 | * 8/1958 | Embler | 414/538 X |
| 3,033,129 | * 5/1962 | De Grandpre | 414/333 X |
| 3,035,728 | * 5/1962 | Hecker | 414/494 X |
| 3,809,266 | * 5/1974 | Salerni | 414/538 X |
| 3,848,896 | 11/1974 | Dennis. | |
| 4,319,863 | 3/1982 | Voges. | |
| 4,358,134 | 11/1982 | Scully. | |
| 4,599,040 | * 7/1986 | Rasmussen | 414/529 X |
| 4,968,210 | * 11/1990 | Friederich | 414/494 X |
| 4,971,355 | 11/1990 | Studdard. | |
| 5,020,960 | * 6/1991 | Provenson | 414/538 X |
| 5,201,546 | 4/1993 | Lindsay. | |
| 5,401,050 | 3/1995 | Baker. | |
| 5,601,303 | 2/1997 | Underwood. | |
| 5,676,513 | 10/1997 | Bingham. | |
| 5,810,544 | * 9/1998 | Wellman | 414/495 |

* cited by examiner

Primary Examiner—Douglas Hess
Assistant Examiner—Gerald J. O'Connor
(74) Attorney, Agent, or Firm—Shook, Hardy & Bacon LLP

(57) ABSTRACT

A transport system for farm combines and other large wheel and track mounted equipment. A trailer for the equipment is constructed by a lightweight manner by providing its frame with narrowly spaced side rails separated by a distance less than the width of the equipment that is carried on the trailer. The axles of the transported equipment are each provided with detachable rollers that slide along the side rails as the equipment is pulled on and off of the trailer by a winch driven pulley and cable system. The narrow width of the trailer minimizes its weight so that the trailer can carry two combines at the same time without the weight exceeding highway weight regulations.

20 Claims, 3 Drawing Sheets

TRANSPORT SYSTEM FOR FARM COMBINES AND OTHER LARGE VEHICLES

FIELD OF THE INVENTION

This invention relates generally to the transporting of large vehicles and more particularly to a trailer system for hauling farm combines and other large vehicles over the road.

BACKGROUND OF THE INVENTION

The harvesting of agricultural crops typically involves the use of large farm implements that are commonly known as combines. Combines are used to cut, thresh, and clean various types of grain. Combines are large and expensive machines that are often used in one field and then moved to other fields for work there. Because combines are extremely heavy and wide, the trailers that carry them between fields must be wide and heavy structures in order to be able to handle the size and weight of the combine.

While it is desirable for efficiency to be able to transport two combines on a single trailer, weight and size considerations make this generally impractical for modern combines. In order to be able to haul two combines at once, the trailer must be wide enough and long enough to handle the size of the combines. This, together with the structural requirements of the trailer, result in the trailer being unduly heavy. The trailer, together with two combines loaded on it, is thus too heavy to comply with highway regulations regarding weight limits. Consequently, it is common practice for combines to be carried between fields one at a time, each on its own trailer. This inefficiency adds to the cost and inconvenience involved in agricultural harvesting operations.

Other types of large equipment face similar problems. For example, bulldozers and other large earth moving and construction machinery are too large and heavy to be easily transported between job sites. Many types of vehicles, both track driven machines and wheeled machines, are subject to the same transportation difficulties.

SUMMARY OF THE INVENTION

The present invention is directed to a unique system for efficiently transporting large vehicles such as agricultural combines, bulldozers, and other heavy equipment. In accordance with the invention, a wheeled trailer has a relatively lightweight frame that includes a pair of parallel side rails. The side rails may take the form of I-beams, and they are spaced apart less than the width of the large machinery that the trailer is intended to carry. This allows the width of the trailer to be minimized which in turn reduces the overall weight of the trailer, a key feature of the invention.

Another important aspect of the invention involves equipping the axles of the vehicle that is to be transported with rollers or other friction reducing elements. These rollers or other elements are spaced apart such that they can ride along the side rails of the trailer while the implement is being loaded onto and off of the trailer. A cable and pulley system may be driven by a winch to pull the combine or other vehicle onto and off of the trailer. By providing rollers on the vehicle axles, the frame of the trailer can be considerably less than the width of the combine, with the combine overhanging both sides of the trailer. As a consequence, the frame of the trailer is reduced in size and weight so that it can simultaneously transport two combines, one behind the other, and still conform to prevailing highway weight limitations.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
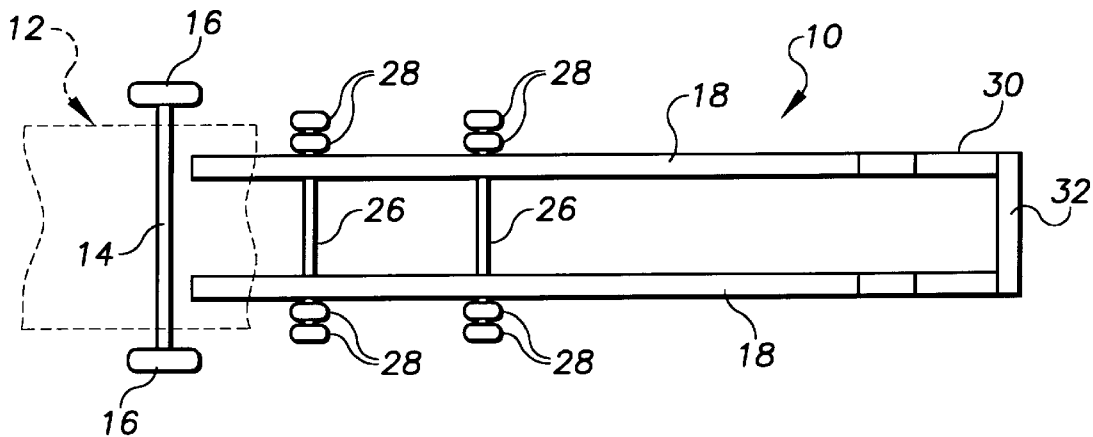
FIG. 1 is a top plan view diagrammatically illustrating a trailer constructed in accordance with the present invention, with a farm combine that can be carried on the trailer partially shown in broken lines.

Referring now to the drawings in more detail and initially to FIG. 1, the present invention is directed to a trailer which is generally identified by numeral 10 and which is used to transport large vehicles such as a conventional farm combine which is partially shown in FIG. 1 and identified generally by numeral 12. The combine 12 has a conventional construction and includes plural axles 14, each of which carries a pair of wheels 16 on its opposite ends.

The trailer 10 has a rigid wheel mounted frame which includes as its principal structural components a pair of parallel side rails 18. The side rails 18 form the opposite sides of the trailer frame and may take the form of I-beam. As best shown in FIG. 3, each of the side rails 18 may include an upper flange 20, a lower flange 22, and a vertical web 24 which connects the upper and lower flanges at their lateral centers. The trailer 10 preferably includes a pair of axles 26 (FIG. 1) which are suitably connected with the side rails 18. Plural wheels 28 are mounted on the opposite ends of each of the axles 26. The front portion 30 of the frame of the trailer 10 extends upwardly somewhat and is equipped with a front cross member 32 and a hitch 34 (FIG. 2) for connection with a suitable towing vehicle such as a truck (not shown).

For simplicity, the construction of the trailer 10 is shown diagrammatically. Suitable structural members which are not shown may be used to connect the two side rails 18 at selected intervals. However, it is noted that the trailer exhibits a narrow width in that the side rails 18 are spaced apart a distance less than the length of the axle 14. Thus, the trailer is relatively narrow and also relatively lightweight because long cross members are not required due to the relatively short spacing between the side rails 18. At the same time, the side rails 18 and the overall trailer frame are constructed in a manner to exhibit the strength necessary to transport the combine 12 along with a second combine, one behind the other on the trailer frame as will be described in more detail.

In accordance with the invention, each of the combine axles 14 is equipped with a pair of friction reducing elements that ride along the side rails 18 of the trailer frame as the combine is being loaded onto and off of the trailer 10. With particular reference to FIG. 3, the friction reducing elements may take the form of flanged rollers 36. Each roller 36 is mounted to turn on a shaft or axle 38 extending between a pair of lugs 40 which are suitably mounted to the axle 14 to project downwardly from its underside. The horizontal rollers 36 are spaced apart on the axle 14 to conform with the spacing between the two side rails 18. In addition, each roller 36 is provided on its opposite ends with flanges 36a which are spaced apart a distance slightly greater than the width of each of the upper flanges 20. Thus, as best shown in FIG. 3, the flanges 36a are located adjacent to the edges of the flanges 20 to provide a guiding function and maintain the rollers 36 on the side rails 18.

Figure 4:
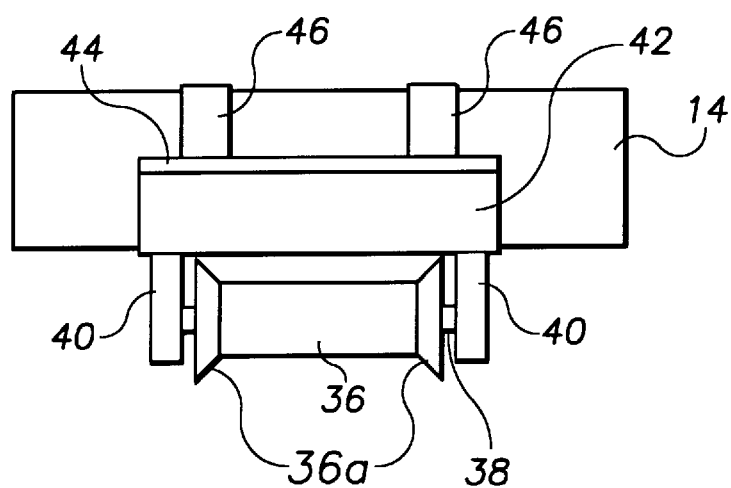
FIG. 4 is a fragmentary rear elevational view showing a detachable mounting arrangement for securing one of the rollers detachably to the combine axle.
Figure 5:
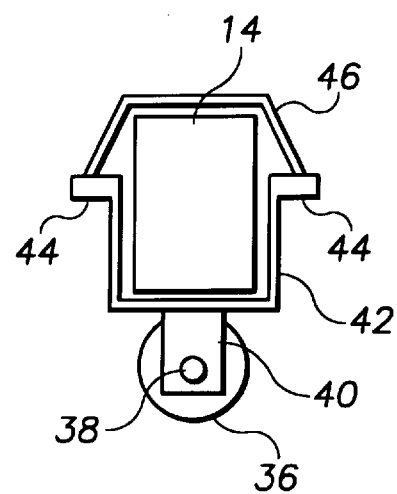
FIG. 5 is a side elevational view showing the detachable mounting of one of the rollers to the combine axle.

While the rollers 36 or other friction reducing elements that are provided may be is permanently mounted on the axles 14, it is generally preferable for the friction reducing elements to be detachably mounted to the combine axles 14 so that they can be removed when the combine is working in agricultural fields. FIGS. 4 and 5 show diagrammatically a system for detachably connecting the rollers 36 with the axles 14.

As shown in FIGS. 4 and 5, the lugs 40 may be attached to brackets 42 which are fitted against the undersides of the axles 14. Each bracket 42 has a pair of outwardly projecting lips 44 on its upper end. A pair of ratchet straps 46 may be provided for each of the brackets 42, with the ratchet straps 46 being connected with the lugs 44 and being capable of being tightened around the top portion of the axle 14 in order to rigidly secure the bracket 42 in place on the axle. The ratchet straps 46 may be loosened and released so that the brackets 42 and rollers 36 can be removed from the axles 14 when not needed.

Figure 2:
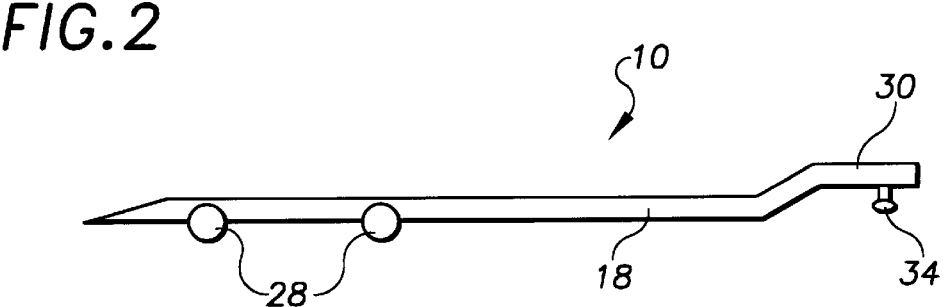
FIG. 2 is a side elevational view of the trailer shown in FIG. 1.
Figure 3:
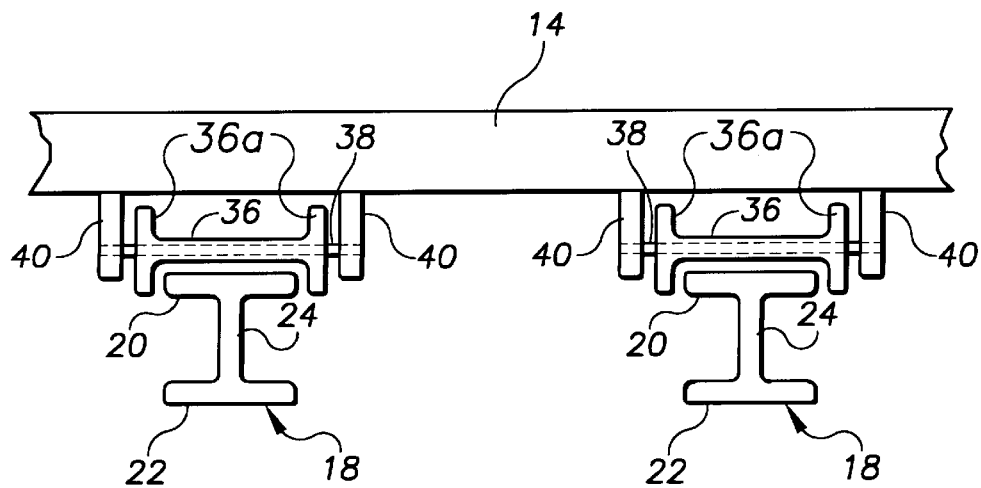
FIG. 3 is a fragmentary rear elevational view on an enlarged scale showing the side rails of the trailer and rollers that are mounted on the axle of the farm combine and roll along the side rails to facilitate loading and unloading of the combine.
Figure 6:
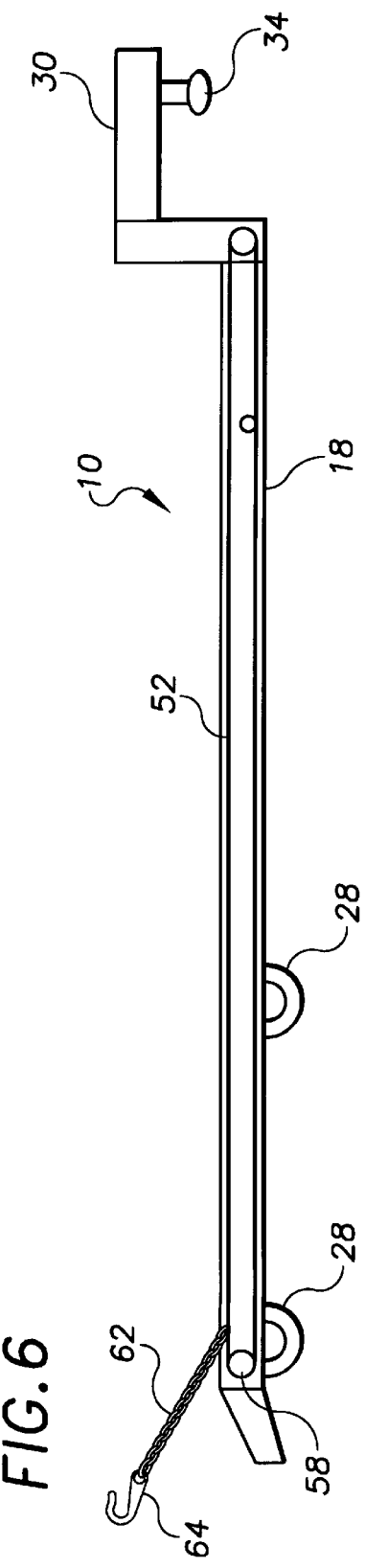
FIG. 6 is a side elevational view of a trailer that is equipped with a cable and pulley system in order to pull a farm combine or other large vehicle onto and off of the trailer in accordance with the present invention.
Figure 7:
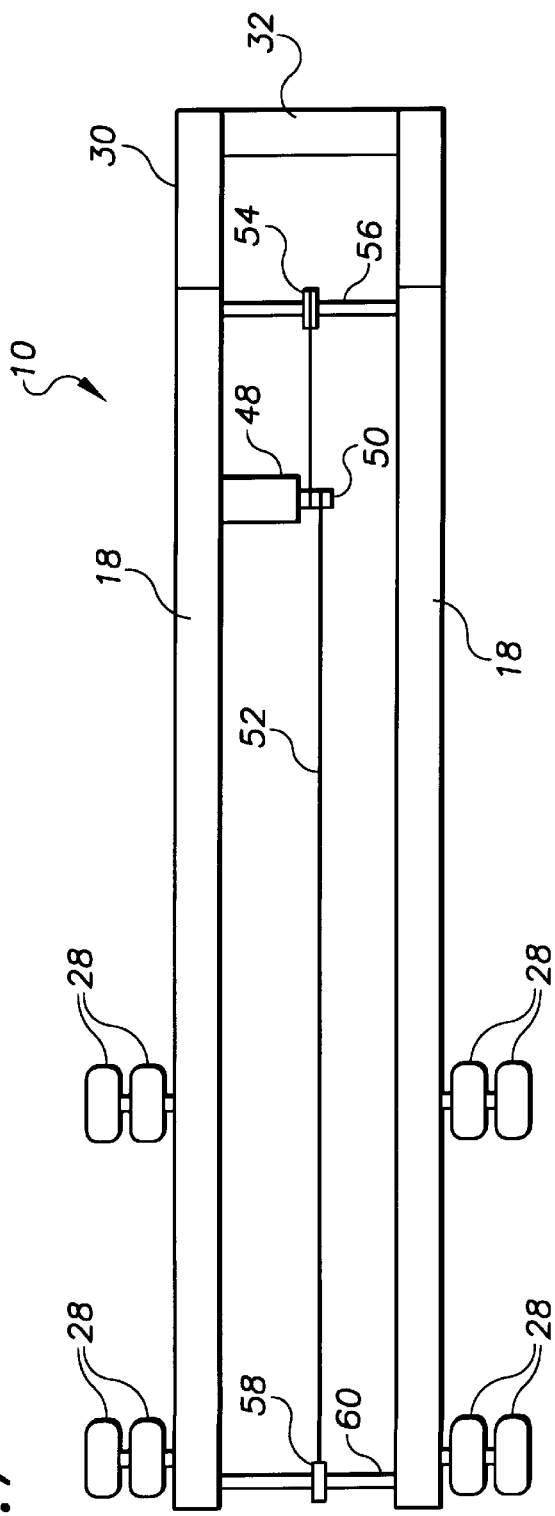
FIG. 7 is a top plan view of the trailer shown in FIG. 6 and depicting details of the cable and pulley system, together with a winch that may be used to drive the cable and pulley system.

FIGS. 6 and 7 depict a cable and pulley system that may be provided for the trailer 10 (shown in FIGS. 6 and 7 in a slightly different front end configuration than in FIGS. 1 and 2). The cable and pulley system is powered by a reversible electric winch 48 (FIG. 7) having a rotating spool 50 around which a flexible cable 52 is wound. The cable is also drawn around a sheave or pulley 54 which may be mounted on a shaft 56 near the forward end of the frame of the trailer 10. The cable 52 is also drawn around another pulley 58 which is mounted near the rear end of the trailer frame on a shaft 60. The cable 52 may be a continuous loop which is drawn frequently around both of the pulleys 54 and 58 and the driven winch spool 50.

Referring to FIG. 6 in particular, a chain 62 or other line may be secured to the cable 52, as by means of a suitable fastener that may be attached to the cable at selected locations along the length of the cable. The opposite end of the chain 62 maybe equipped with a hook 64 that may be hooked to the axle 14 or some other part of the frame of the combine 12.

The trailer 10 is used to transport two of the combines 12 at a time, one behind the other, over the road between agricultural fields or other sites. It is to be understood that the trailer may also be used to transport other types of large track or wheeled vehicles, one at a time or more than one at a time in substantially the same manner as for the combine 12.

In order to load the first combine 12 onto the tractor 10, the chain 62 is attached to the portion of the cable 52 adjacent to the rear end of the tractor, and the trailer is located adjacent to the front end of the combine such that the hook 64 can be hooked to the frame of the combine. The winch 48 is then operated in a direction to pull the top run of the cable 52 forwardly, thus pulling the combine 12 onto the trailer 10 with the rollers 36 moving onto and riding along the top flanges 20 of rails 18 as the combine is progressively pulled onto the trailer frame. As the top run of cable 52 moves forwardly, the chain 62 pulls the combine progressively in a forward direction until it has been fully loaded onto the frame at the desired position. The rollers 36 mate with and ride along the rails 18 in order to facilitate loading of the combine and pulling of it to the desired position with the cable and pulley system. The end flanges 36a butt the edges of the side rail flanges 20 to maintain the pulleys on the rails and guide the combine onto the trailer. Once the combine has been filly loaded onto the trailer, the rollers 36 can be suitably blocked to prevent them from moving.

If desired, a second combine canbe loaded onto the trailer 10 behind the first combine by unhooking the chain 62 from the first combine and operating the winch 48 in a direction to return the chain to the rear end portion of the trailer before hooking it onto the second combine and loading it in the same fashion as the first combine. Alternatively, the chain 62 can be detached from the cable 52 and reattached near the back end of the trailer.

The equipment on the trailer 10 can be unloaded by essentially reversing the loading process. The chain 62 can be positioned such that it can be hooked onto the front end portion of the rear combine 12, and the winch can then be operated in a direction moving the chain rearwardly in order to move the rear combine off of the trailer. The front combine can similarly be unloaded, with the rollers 36 moving along the side rails 18 in both instances to facilitate the unloading operation.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, I claim:

1. A method for the transport of a farm combine having a pair of axles each carrying spaced apart wheels, comprising:

providing a wheeled over the road trailer for carrying the combine, said trailer being constructed to travel on flat roads and having a frame which includes substantially parallel side rails spaced apart a distance less than the distance between said wheels on each axle of the combine;

coupling a pair of friction reducing elements on each axle spaced apart less than the distance between said wheels at locations to move onto and along said side rails when the combine is loaded onto said trailer; and operating a power mechanism associated with the trailer for pulling the combine onto said trailer with said friction reducing elements moving along said side rails as the combine is pulled onto said trailer.

2. A transport method as set forth in claim 1, including a detachable mechanism carrying said friction reducing elements, said mechanism being detachably applicable to said axle.

3. A transport method as set forth in claim 2, wherein said friction reducing elements comprise rollers for rolling motion on the side rails.

4. A transport method as set forth in claim 1, wherein said friction reducing elements comprise rollers for rolling motion on the side rails.

5. A trnsport method as set forth in claim 4, wherein:
each side rail includes opposite side edges; and
each roller includes enlarged flanges adjacent said side edges for guiding the roller along the corresponding side rail.

6. A transport method as set forth in claim 1, wherein said power mechanism comprises:
a plurality of pulleys on said frame of the trailer;
a cable drawn around said pulleys and adapted for attachment to the combine to pull the vehicle when the cable is driven; and
a drive mechanism for driving the cable.

7. A transport method as set forth in claim 6, wherein said drive mechanism comprises a reversible winch operable to drive the cable in opposite directions to load and unload the combine.

8. A transport method as set forth in claim 6, including a detachable mechanism carrying said friction reducing elements, said mechanism being detachably applicable to said axle.

9. A transport method as set forth in claim 8, wherein said friction reducing elements comprise rollers for rolling motion on the side rails.

10. A transport method as set forth in claim 6, wherein said friction reducing elements comprise rollers for rolling motion on the side rails.

11. A transport method as set forth in claim 10, wherein:
each side rail includes opposite side edges; and
each roller includes enlarged flanges adjacent said side edges for guiding the roller along the corresponding side rail.

12. A transport method as set forth in claim 6, wherein:
each side rail comprises an I beam having top and bottom flanges connected by a web; and
said friction reducing elements comprise rollers for rolling movement along said top flanges of the side rails.

13. A transport method as set forth in claim 12, wherein:
the top flange of each side rail includes opposite side edges; and
each of said rollers has flanged opposite ends adjacent said side edges for guiding the roller along the top flange of the corresponding I beam.

14. A method for transporting a farm combine, comprising:
providing a wheeled over the road trailer having a frame which includes a pair of substantially parallel side rails, said trailer being constructed to travel on flat roads;
providing a fann combine having a pair of axles each carrying spaced apart wheels, each axle having a length greater than the distance between said side rails;
coupling a pair of rollers to each axle at locations spaced apart to conform with the spacing between said side rails; and
operating a power mechanism for pulling the combine onto and off of said trailer with said rollers riding along said side rails as the combine is moved onto and off of said trailer.

15. A combination as set forth in claim 14, wherein said power mechanism comprises:
a plurality of pulleys on said frame of the trailer;
a cable drawn around said pulleys and adapted for attachment to the combine to pull the combine when the cable is driven; and
a drive mechanism for driving the cable.

16. A transport method as set forth in claim 15, wherein said drive mechanism comprises a reversible winch operable to drive the cable in opposite directions to load and unload the combine.

17. A method for transporting a farm combine, comprising:
providing an over the road trailer having a frame mounted on wheels, said trailer being constructed to travel on flat roadways and said frame including a pair of opposite side rails;
presenting the trailer to a farm combine having a pair of axles each carrying wheels spaced apart on the axle a distance greater than the distance between said side rails;
detachable coupling a pair of rollers to each axle at locations spaced apart to conform with the spacing between said side rails; and
operating a power driven cable and pulley mechanism for pulling the combine onto and off of the trailer with said rollers riding along said side rails as the combine is moved onto and off of the trailer.

18. The method of claim 17, wherein:
each side rail includes opposite side edges; and
each roller includes enlarged flanges adjacent said side edges for guiding the roller along the corresponding side rail.

19. A method for the transport of a farm combine having a pair of axles each carrying spaced apart wheels, comprising:
providing a wheeled over the road trailer for carrying the combine, said trailer being constructed to travel on flat roadways and having a frame which includes substantially parallel side rails having opposite side edges;
presenting the trailer to the combine:
coupling a pair of rollers to each axle of the combine in a location spaced apart to move onto and roll along said side rails when the combine is loaded onto said trailer, each roller including enlarged flanges adjacent said side edges for guiding the roller along the corresponding side rail; and
operating a power mechanism for pulling the combine onto said trailer with said rollers moving along said side rails as the combine is pulled onto said trailer.

20. A method for transporting a farm combine having a pair of axles each carrying spaced apart wheels, comprising:
providing a wheeled over the road trailer for carrying the combine, said trailer being constructed to travel on flat roadways and having a frame which includes substantially parallel side rails each comprising an I beam having top and bottom flanges connected by a web;
coupling a pair of rollers on each axle of the combine in a location spaced apart from one another to move onto and roll along said top flanges of the side rails when the combine is loaded onto said trailer; and
operating a power mechanism for pulling the combine onto said trailer with said rollers moving along said side rails as the combine is pulled onto said trailer.

* * * * *